United States Patent [19]

DiVincenzo

[11] 4,223,856

[45] Sep. 23, 1980

[54] HELICOPTER GROUND HANDLING EQUIPMENT

[75] Inventor: Gary A. DiVincenzo, Westchester, Pa.

[73] Assignee: Rorer Group, Inc., Fort Washington, Pa.

[21] Appl. No.: 955,509

[22] Filed: Oct. 27, 1978

[51] Int. Cl.² ............................ B64C 25/32; B64F 1/22
[52] U.S. Cl. ................................... 244/50; 180/14 C; 254/2 R; 254/133 R
[58] Field of Search ........................... 244/50, 63, 116; 180/14 C, 14 E; 254/2 R, 2 B, 86 R, 133 R; 280/9

[56] References Cited

U.S. PATENT DOCUMENTS

| | | | |
|---|---|---|---|
| 2,641,423 | 6/1953 | Harriman et al. | 280/9 X |
| 3,279,722 | 10/1966 | Glover, Jr. et al. | 244/50 |
| 3,740,020 | 6/1973 | Arnes | 254/2 B X |
| 4,033,422 | 7/1977 | Benning | 244/50 X |

Primary Examiner—Charles E. Frankfort
Attorney, Agent, or Firm—Ernest G. Szoke; James A. Nicholson

[57] ABSTRACT

Equipment is provided for ground handling of skid equipped helicopters utilizing existing wheel attachment fittings on the skids; the equipment comprising adapters for attaching an adjustable load carrying member to the existing wheel attachment fittings whereby the load carrying member can be engaged by the lifting element of a mobile lifting dolly for lifting and transporting the helicopter.

5 Claims, 17 Drawing Figures

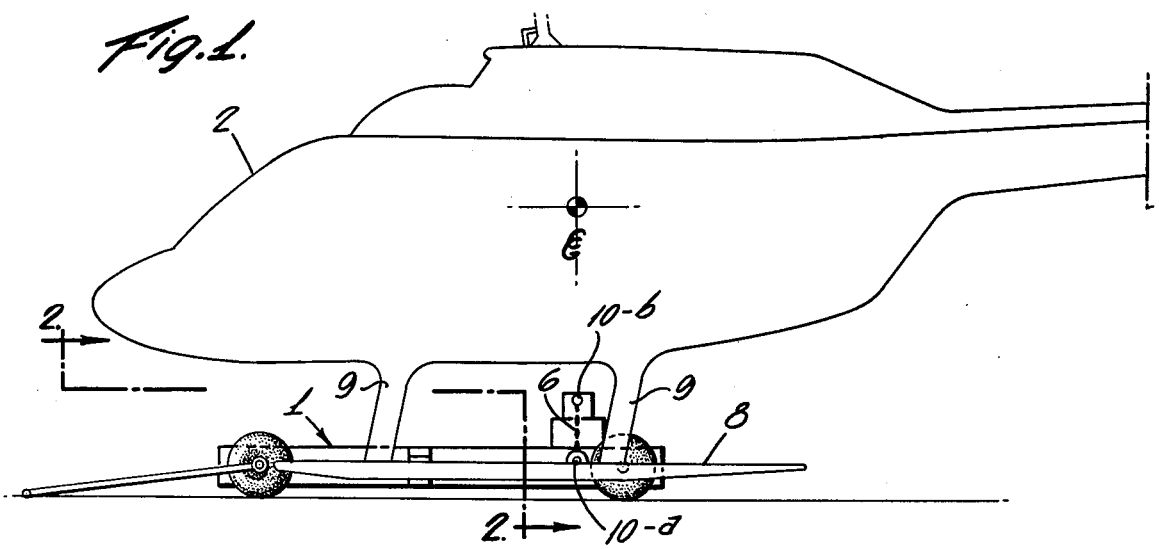
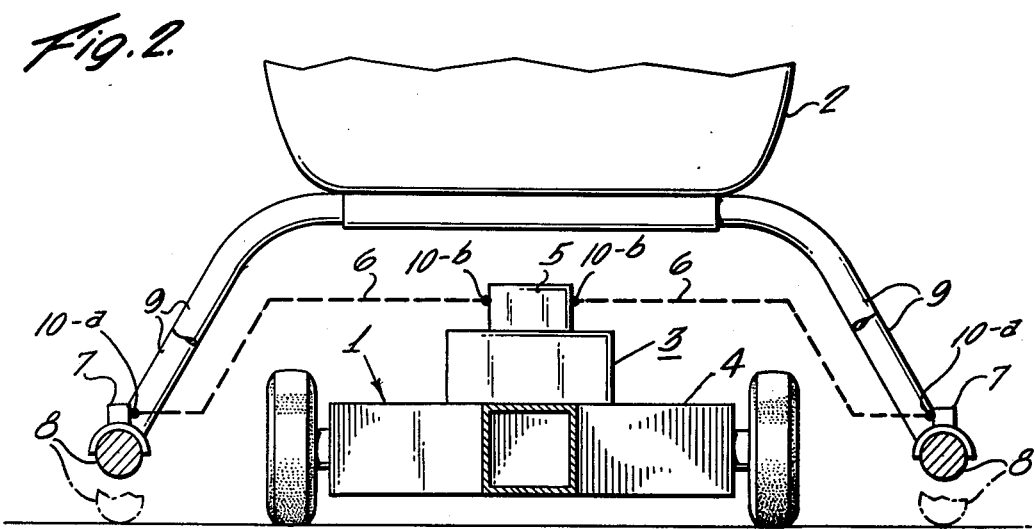
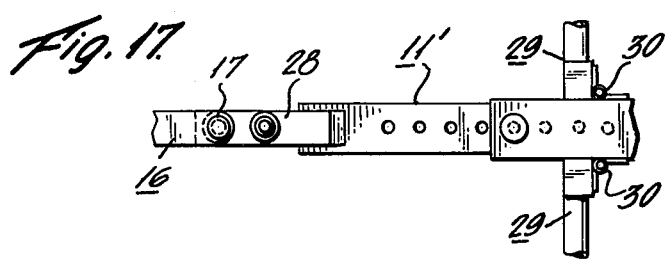
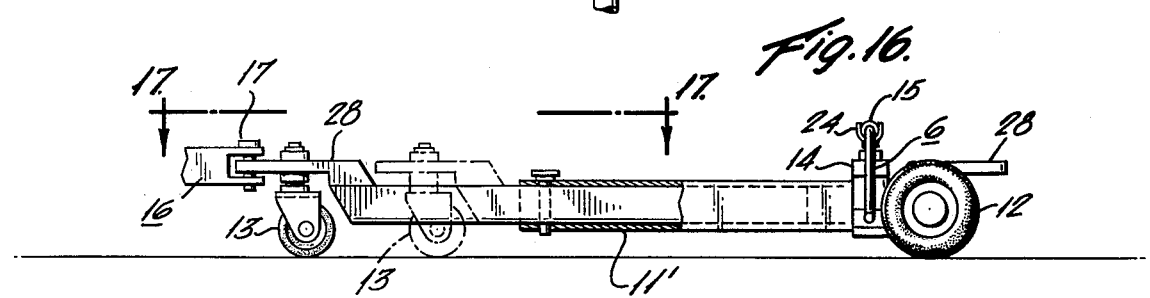

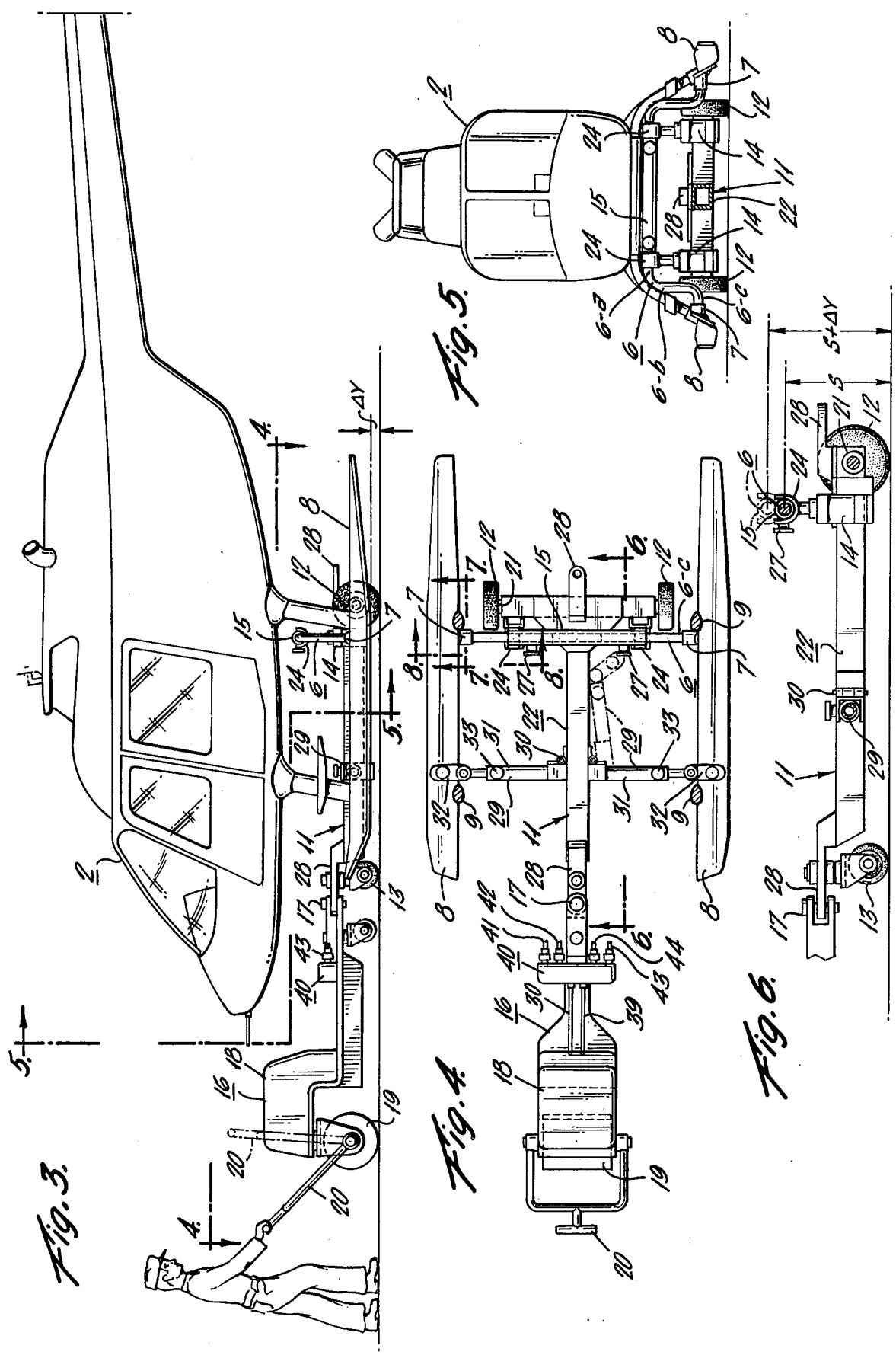

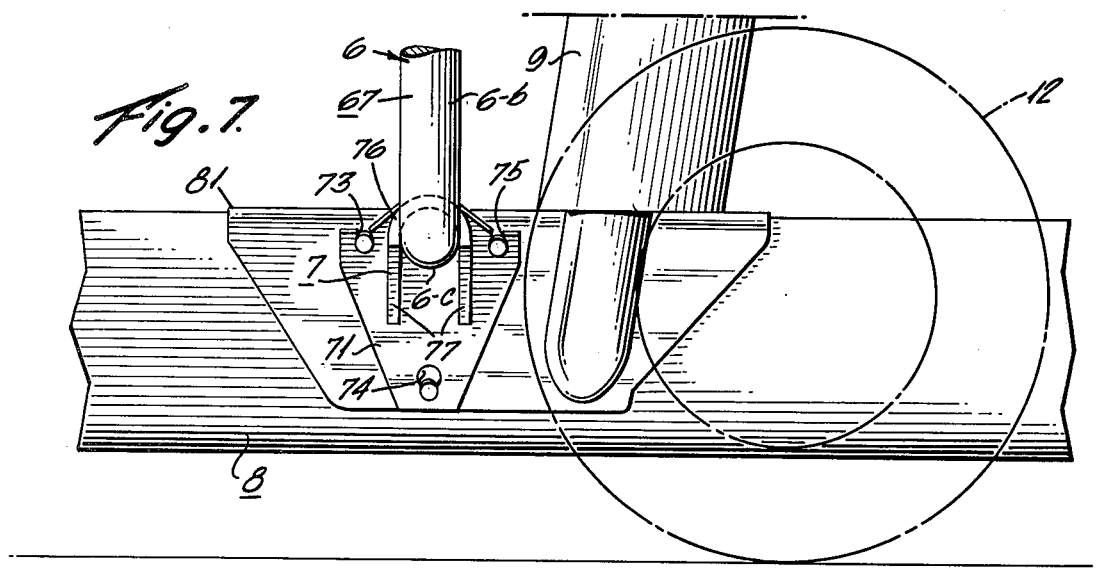
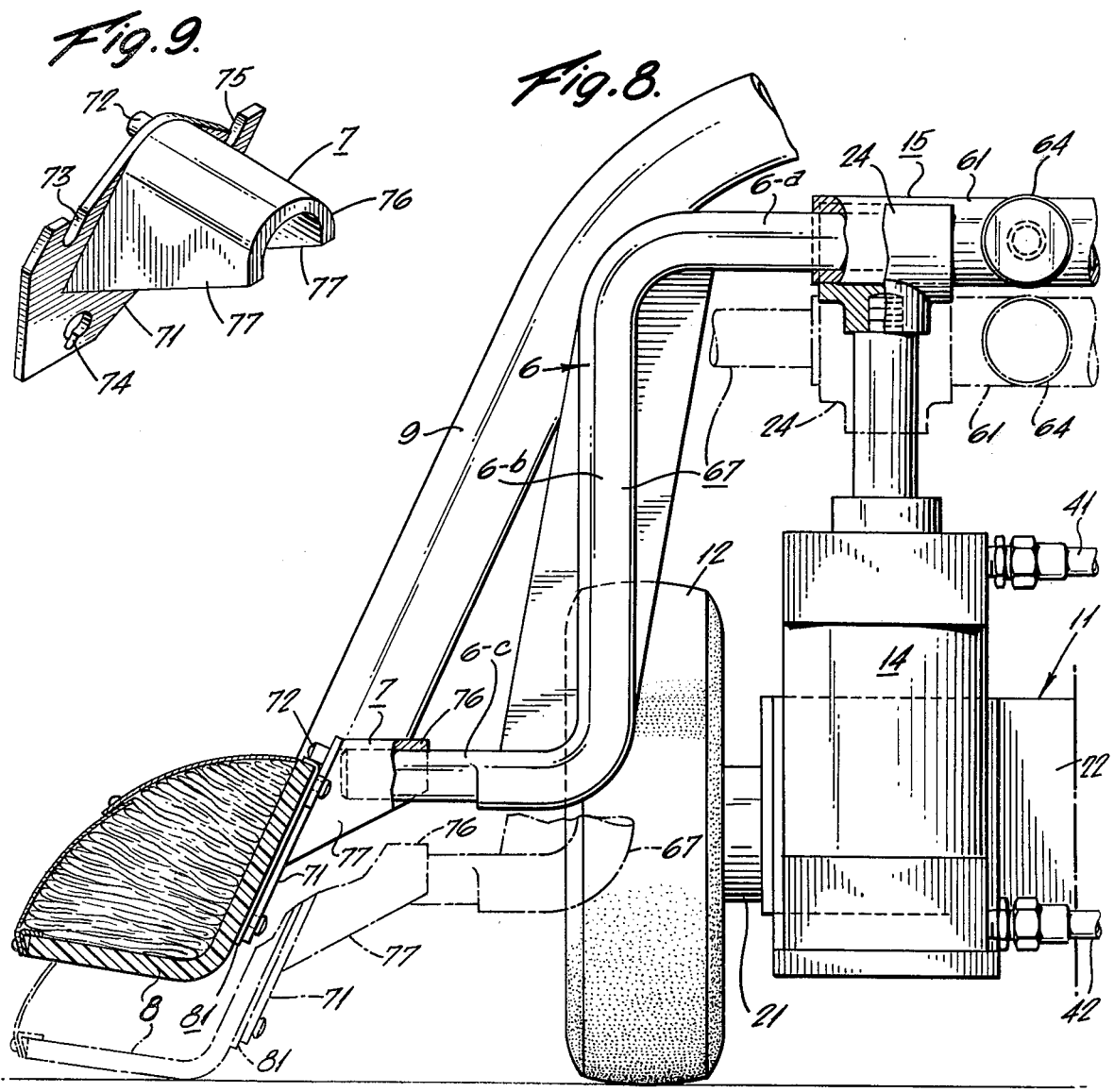

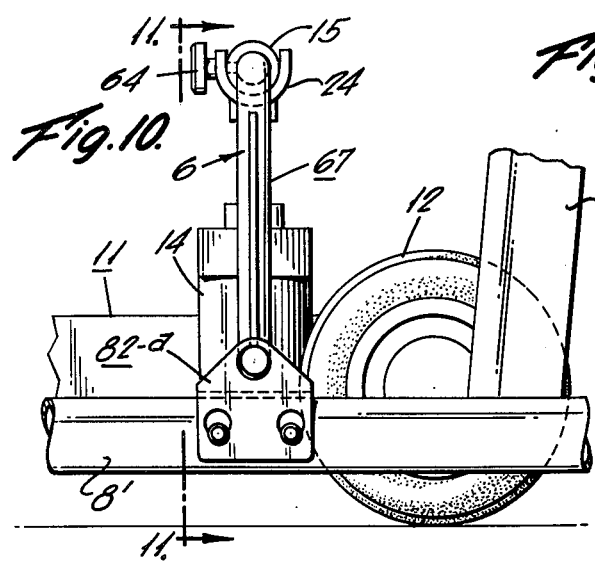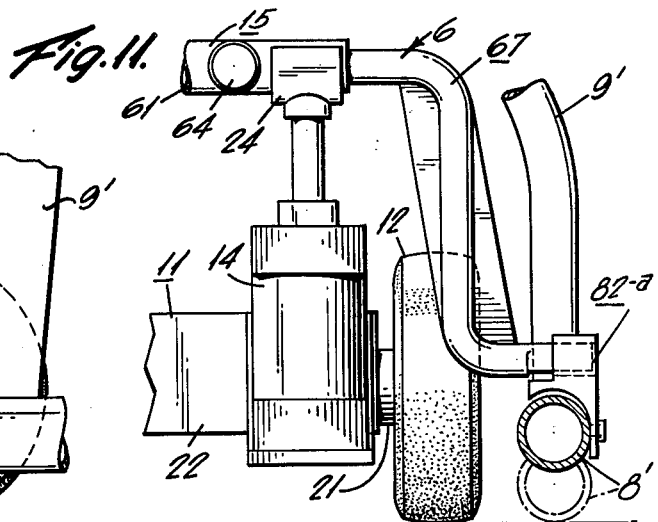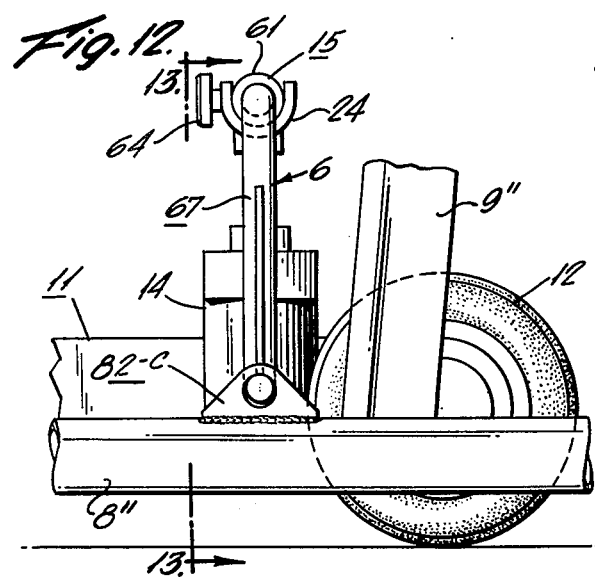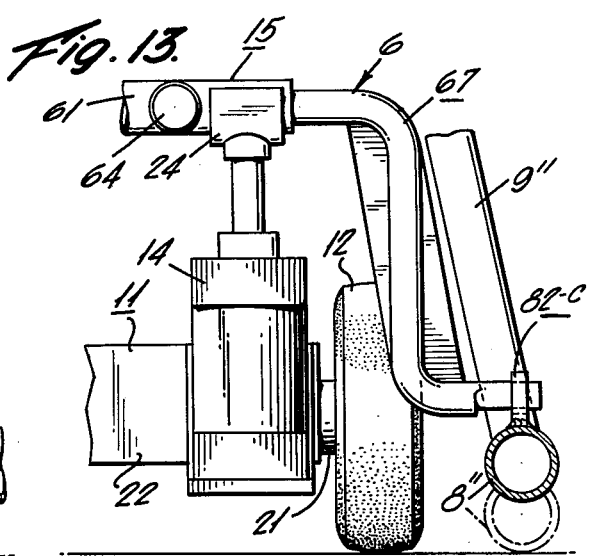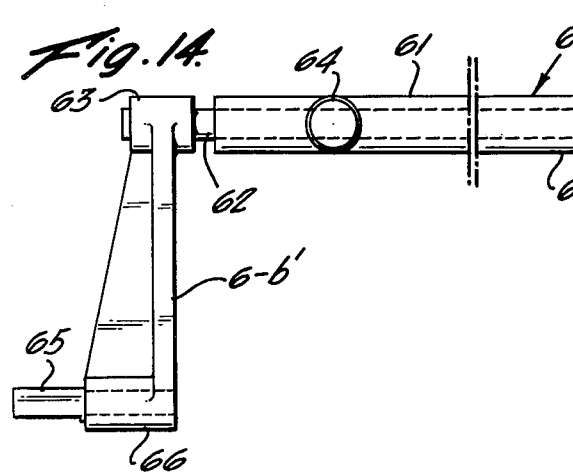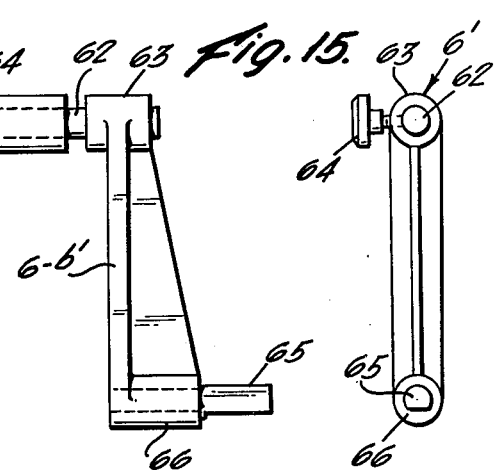

HELICOPTER GROUND HANDLING EQUIPMENT

FIELD OF THE INVENTION

This invention relates to devices for ground handling aircraft; specifically, for lifting and transporting helicopters equipped with skid type landing gear.

DESCRIPTION OF THE PRIOR ART

Heretofore, the typical means of maneuvering a helicopter with skid type landing gear was (1) to attach its factory supplied ground handling wheels. This type of ground handling is illustrated for example in U.S. Pat. No. 3,279,722; (2) to land the helicopter on a platform equipped with wheels which platform is then towed with a power unit. Landing platforms and towing equipment of this type are available from Sharon Manufacturing Inc., Sharon Center, Ohio; and (3) by hydraulic lifting and towing devices specifically adapted to accommodate only helicopters of a particular design such as the lifting device available under the brand name "Tug-a-Lug."

Such prior devices have numerous disadvantages which include the following:

(1) hydraulic lifting devices that are available cannot be utilized to handle different model helicopters with different skid size or design.

(2) manufacturer-supplied ground handling wheels require two handlers, one to hold down on the tailboom of the helicopter while the other attaches the wheels. Two people are also required to push the helicopter into the hangar. Furthermore, when attaching and removing these wheels, undue stress is put on the skids and airframe components. Careless operations can easily result in scratching skid cross tube fairings and fuselage undercarriage. After the wheels are attached, a hand-operated liner is generally employed to push the wheel over a cam that raises the skid. It requires a hefty person with better than average strength and dexterity to push the liner down and is a frequent cause of serious injury;

(3) landing platforms, although convenient and capable of being handled by one person with a towing device, also have numerous disadvantages. An owner of a large fleet of helicopters must have a platform for each helicopter. Platforms, being wider than the width of the helicopter, take up valuable hangar space. They cannot be used with some conventional hangar doors because the additional height added by the platform will not allow enough clearance to pass through the hanger door. Furthermore, a helicopter parked on the ground must be started up and hovered onto the platform before being hangared. Landing on the platform itself can be dangerous if there are gusty or high crosswind components. Should a helicopter have a maintenance problem whereby it cannot be flown to the platform, the maintenance would have to be performed outside in the weather;

(4) hydraulic devices for specific model helicopters are limited because they will only adapt to a few of the many model helicopters on the market. Also, if the helicopter intended for use has its antenna mounted to the undercarriage, there will not be enough clearance to maneuver the device under the helicopter. A further disadvantage to one particular device is that it must be lined up with four adapter pads mounted on the cross tubes under the helicopter. Should the operator miss one of these pads, there is a danger of jacking the device through the belly of the helicopter, or the helicopter could inadvertently fall off the pads causing costly damage.

A further drawback to existing ground handling methods is that none of these methods allow for handling all types of helicopters with a single piece lifting and towing device. It is therefore an object of this invention to provide a method and means whereby a single power operated lifting and towing device can be employed to move all types of skid-equipped helicopters. It is a further object of this invention to provide a device for easy installation and removal that can be readily attached to the existing lifting points of any conventional helicopter design and operatively engaged by hydraulic lifting and towing equipment. A further object is to provide skid adapters and a reusable yoke whereby a single person can readily transform the skid assembly of a skid-equipped helicopter of conventional design into a ground transport assembly that can be conveniently and quickly engaged by an elevating type dolly for lifting and transporting by one person. These and other objects will become more apparent from the drawings and description of the invention which follows.

SUMMARY OF THE INVENTION

The present invention provides a universally useable means for overcoming the problem of moving skid type helicopters on the ground and particularly, a means for overcoming the disadvantages of present helicopter handling devices. It is a feature of this invention that the ground handling device provided is adaptable for use on the majority of helicopters with skid type landing gear. The invention provides a lifting member or yoke which can be quickly and easily installed on a variety of different model helicopters, regardless of skid size and design through the use of adapters which connect to the ground handling wheel attachment points common to all skid type helicopters.

In a preferred embodiment, the present invention employs a telescoping lifting bar which is adjustable for the various skid widths of different helicopters. The telescoping bar connects to the skids through adapters attached to the wheel attachment points whereby the helicopter can be lifted and transported without placing stress on any points other than those points which are capable of carrying the helicopter load without undue stress and in accordance with the manufacturer's design. The telescoping bar is provided with a steadying arm to grasp the forward portion of the skid as an anti-teetering device.

A mobile hydraulic lifting device or alternative lifting and transporting equipment low to the ground is provided for use in combination with the detachable lifting bar or yoke such that the lifting device can be rolled under a helicopter (including those with antenna mounted to their undercarriages) and positioned under the yoke mounted to the skid supports through adapters whereby the lifting device can engage the yoke to raise and carry the helicopter.

The lifting bar or yoke and adapters of this invention enable one person to install the yoke and raise and transport a helicopter by means of a power lifting and towing device. The helicopter can be dropped wherever desired and the yoke and lifting device kept continuously in use. The operator simply maneuvers the hydraulic lifting device under the helicopter parallel to the skids. He then attaches the skid adapters that match the particular helicopter design and inserts the adjustable lifting bar into the adapters. The hydraulic lifting device is then positioned to engage the lifting bar which in turn raises the helicopter clear of the ground. The helicopter elevated on the lifting bar will be teetering at its center of gravity. A telescoping anti-teetering device is provided so that the operator can attach it to the forward portion of the skid to steady the helicopter while towing it on the ground or into a hangar.

BRIEF DESCRIPTION OF THE DRAWINGS

FIG. 1 is a schematic side elevation illustrating the universal ground handling equipment of the invention.

FIG. 2 is a transverse sectional elevation on the line 2—2 of FIG. 1.

FIG. 3 is a side elevation of the invention showing the lifting helicopter transporter mechanism in use (in elevated position).

FIG. 4 is a sectional plan view taken on the line 4—4 of FIG. 3.

FIG. 5 is a transverse sectional view taken on the line 5—5 of FIG. 3.

FIG. 6 is a sectional side elevation taken on the line 6—6 of FIG. 4.

FIG. 7 is a fragmentary sectional elevation taken on the line 7—7 of FIG. 4.

FIG. 8 is an enlarged fragmentary transverse sectional view, taken on the line 8—8 of FIG. 4.

FIG. 9 is a perspective view showing one form of adapter utilized in the invention with the particular helicopter skid design as shown.

FIG. 10 is a fragmentary side elevation of a different helicopter having a different skid configuration (tubular) and showing a different form of adapter and utilizing the same universally adaptable lifting device and transporter.

FIG. 11 is a transverse section taken on the line 11—11 of FIG. 10.

FIG. 12 is a fragmentary side elevation showing still another helicopter skid design having an integrally attached adapter.

FIG. 13 is a transverse section taken on the line 13—13 of FIG. 12.

FIG. 14 is a front elevation showing a modified adjustable load carrying cross member.

FIG. 15 is a right side elevation of FIG. 14.

FIG. 16 is a fragmentary side elevation of the carriage structure shown in FIG. 6 but having an extendible portion to provide a carriage of adjustable length.

FIG. 17 is a fragmentary plan along the line 17—17 of FIG. 16.

DETAILED DESCRIPTION OF THE INVENTION

Referring to the drawings, FIG. 1 shows the invention in schematic form including a mobile lifting and towing device or dolly generally illustrated at (1) engaging a temporary helicopter support assembly shown in dotted line at (6). The mobile lifting device (1) is shown positioned underneath a skid-equipped helicopter (2) shown with the helicopter elevated to a position with skids (8) off the ground. The helicopter is thus shown supported on the lifting dolly through the support assembly (6) detachably linked to the skids at (10-a), and operatively engaging the lifting dolly at (10-b).

FIG. 2 shows in cross-sectional schematic form the mobile lifting and towing device (1) having an elevating device (3) operatively engaging a load-carrying means (6) attached to the helicopter skids (8) through adapters (7); said elevating device (3) is mounted on a movable carriage (4). The upper end of said elevating device (3) is provided with receiving means or cradle (5) to operatively engage the load carrying means or yoke (6) which in turn supports the helicopter by use of the manufacturer-designed lifting points located on the skids (8) through adapters (7) fitted to the lifting points of the helicopter skids (8) for example, a wheel mounting means provided on the helicopter skid by the manufacturer. By utilizing the existing lifting points, the lifting force acts through the vertical center of gravity line of the helicopter (CG).

Alternatively, the yoke or similar lifting support of the invention can be removably attached directly to the supporting struts (9), or other convenient helicopter body components which takes advantage of other lifting points or supporting members designed by the manufacturer to carry the load of the helicopter.

There is thus provided a support assembly comprising a yoke and adapters for quick and simple installation and removal and suitably fitted to and used with any skid mounted helicopter of conventional design, said yoke being transversely adjustable so as to fit between the supporting struts of the helicopter and attach to the struts or skids through individual adapters which connect the yoke to the lifting points by mounting on the skids or struts, as will be more fully described. The adapters are of a configuration such that one side of the adapter is provided with a universal mating means to releasably connect with the end of the yoke, and the other side is provided with mating means specifically adapted for attachment to existing lifting points provided by the helicopter manufacturer for wheel attachment or to other manufacturer-designed lifting points. When the yoke is installed, it will be aligned with the center of gravity line vertically through the helicopter (CG) so that the load supported by the yoke is balanced both longitudinally and transversally thereby to provide minimum moment around the lifting points with least tendency towards pitching or yawing when transporting the helicopter over the ground.

The yoke (6) shown schematically in FIG. 2, generally takes the form of a curved or offset crossbar as shown in FIG. 5 with an extended transverse center section (6-a), substantially vertical mid sections (6-b), and end sections (6-c) adapted to be removably attached to the skid mounted adapters. The support member or yoke (6) provides an extended support area easily engaged by one or more jacks or similar lifting devices to elevate the helicopter with the lifting force applied at a level well above the level of the skids. The lifting support or yoke can be of any suitable design, though a simple curved or offset bar can be readily utilized. The yoke can be constructed of several pieces to provide adjustability or it can, for example, be appropriately hinged between sections 6-a, 6-b and 6-c to permit a single yoke to be fitted to all conventional skid-equipped helicopters.

By way of illustrating a suitable yoke, there is shown in FIG. 14 a multi-component yoke (6) comprising a center section consisting of a sleeve (61) fitted onto two lifting rods (62) whose opposite ends are journalled in cylindrical ends (63) of vertical support members (6-b'). The rods (62) can be moved in or out of sleeve (61) to adjust the transverse length of the yoke. The rods (62) can be locked in any position to fix the length by adjustable locking means such as set screws (64). The vertical sections (6-b') are shown with journal bearing ends (63) adapted to receive rods (62) which are free to turn inside the end (63). The opposing ends of vertical sections (6-b') are fitted with axle type rods (65) adapted to fit into existing supports or brackets for mounting wheels on skid-equipped helicopters. The rods or axles (65) are journelled in cylindrical ends (66) of vertical section (6-b') in the same manner as rods (62) are fitted to the opposing ends (63). Optionally, the yoke can have adjustable vertical side sections (6-b'), for example telescoping tubes with locking cross pins. Adjustable vertical sections will enable the same yoke to be used with elevating means having a fixed lifting distance, e.g. hydraulic rams with a fixed stroke, notwithstanding the point of attachment for the adapters may be at varied heights for helicopters of different designs. In this way, the helicopter can be lifted to raise the skids above the ground approximately the same distance, preferably at least about three inches even though the adapters are attached at higher or lower points on the skids.

The preferred form of adapters are as shown in FIG. 9 wherein the coupling end for engagement by the yoke is a simple half-cylinder or u-shaped element that is easily engaged and disengaged by the axle ends of the yoke for lifting by simply sliding the yoke ends up into the adapter and holding them in place by the upward lifting force. After the helicopter is transported to a new position and lowered to the ground, the yoke is disengaged by simply lowering the jacks. The yoke, which disengages from the adapters when it is dropped below the level of the adapters with the helicopter on the ground, remains with the dolly when it is withdrawn for use in lifting and transporting another helicopter fitted with adapters having similar coupling ends which can be standardized along with the yoke ends for universal use at all helicopter ground handling sites. Both the adapters and yoke can be made of any suitable construction material of sufficient strength to carry helicopters weighing about 5000 pounds or more. The preferred yoke is a trunnion type simple bent cross bar transversely adjustable in the mid-section and fitted with axle type ends that can be used for easy lifting engagement with adapters of the type shown in FIG. 9 or by sliding into axle bearings carried on some helicopters as a permanent fixture for mounting ground handling wheels. If desired, adapters can be permanently affixed to the helicopter skids. Where adapters of the type shown in FIG. 9 are utilized, the yoke can be inserted simultaneously with positioning the elevating dolly underneath the helicopter by placing the yoke in the lift cradle or otherwise operatively connecting the yoke to the jack or jacks mounted on the elevating dolly.

It will be understood that neither the yoke nor the adapters need be of the precise form or shape illustrated. A considerable degree of strength and rigidity is necessary as is also reasonable tolerances between the size of mating members, however, within these general limits wide latitude may be exercised in the particular design of the lifting assembly.

The lifting means can be of conventional type such as hydraulic jacks, scissors jacks or other power-operated or manually operated jacks which provide sufficient mechanical advantage to permit a single operator to raise a helicopter of conventional design. The lifting device will usually be mounted on a low-profile carriage with an axle and a pair of wheels at one end and a castor or dual castors for steering at the other end. The width of the elevating dolly should be such that it will fit between the skids of all helicopters. The front and rear wheel assemblies are joined by a rigid frame of sufficient strength to carry any conventional helicopter. Alternatively, the carriage frame can be a telescoping arrangement with an axle and two wheels at one end and a single steerable wheel at the other end.

Referring now to the particular embodiments shown in FIGS. 3 to 17, and more fully described hereafter, the invention is described in terms of the best mode now contemplated; however, it will be understood that various design modifications and mechanical alternatives can be substituted for the structure shown, all of which modifications are considered to be within the scope of the present invention.

Referring now to FIG. 3, there is shown a conventional helicopter (2) equipped with skid-type landing gear (8) resting on a low profile truck (11) equipped with rear wheels (12) and a single forward caster (13) and having hydraulic lifting devices (14) engaging cross bar (15) attached to the helicopter skids. The truck (11) is shown linked to a self-powered driving truck (16) through a coupling mechanism (17) which permits a short turning radius by allowing the driving truck to turn about the coupling mechanism. The power truck is generally equipped with a power source (18) which drives wheel (19), which is pivotally arranged for steering with handle (20).

Referring now to FIGS. 4 and 5, in which like numerals designate like components, there is shown the low profile truck (11) fitted between skids (8). The truck consists of a rear axle (21) and a pair of rear wheels (12) mounted thereon and carrying a frame or chassis (22) upon which are mounted one or more hydraulic jacks (14), shown more clearly in cross-section in FIG. 5. The hydraulic jacks carry a receiving means or cradle (24) which engages with the telescoping cross bar or yoke (15) attached to the skids through adapters (7). The telescoping cross bar (15) may be adjusted to the appropriate width and locked into the extended position such that the lower ends or axles (6-c) are operatively engaged with the adapters by tightening set screws (27). The truck is towed by means of a tow bar (28) which may be an integral part of the frame extending beyond the axle at one end and beyond the second axle or single caster at the other with coupling devices at both ends to permit the truck to be towed from either end. As shown, the wheels of the truck are rearward of the load carrying hydraulic lifting means so as to cause a slight forward moment creating a light downward pressure on the front caster. Tow bar (28) carries one or more extendable arms (29) positioned forward of the hydraulic lifting jacks. The extendable arms can be moved in a swinging manner from a closed position parallel to the tow bar into an engaged position with the forward end of the helicopter skids. The extendable arm is attached to the bar by hinge means (30) and is telescoped (31) to enable extension of the bar so as to cause a gripping device (32) to contact and hold the skid (8), thereby preventing the helicopter from teetering on the truck. The telescopic bar can be locked in its extended position by set screws (33).

FIGS. 10 and 12 illustrate alternative adapter arrangements shown installed on a helicopter skid with the adjustable load-carrying member attached and an elevating dolly in place. FIG. 14, as previously mentioned, shows a multicomponent supporting assembly or yoke illustrative of the variety of designs contemplated by the present invention, all of which are intended to come within the scope of the invention. As shown elsewhere, for example, in FIGS. 8 through 13, the load-carrying cross member can be made of two identical side pieces (67) joined by a center sleeve section (61). When installed, the side pieces are journalled at one end in the adapters (7) and journalled at the other end in a sleeve section (61) and locked in place with set screws (64). Alternatively, either or both ends of the side pieces (67) can be formed as a cylindrical sleeve to fit onto a mating male type fitting on the adapters and joined by a solid bar type center portion skidably received in the cylindrical sleeve ends of the side pieces. Thus, while the yoke or support assembly is generally shown as having male type fittings adapted to mate with female type fittings mounted on the adapter, it will be appreciated that the fittings can be reversed or other conventional quick release means can be provided for joining the load carrying cross bar to the adapters or directly to the wheelmounting device where such is provided as a fixed part of the helicopter skid. In still another configuration, a connector or cross bar can be attached directly to the helicopter landing struts (9) where one set of such struts, either the fore or aft struts, are generally aligned so as to pass through a vertical plane taken transversely through the longitudinal center of gravity. In any case, the shape of the yoke or cross bar should be such that when in place, its center section is oriented forward or back of the point on either side where it is connected to the skids or struts so as to place the center section in vertical alignment with the center of gravity line when the helicopter is resting on the skids. In any event, the support assembly of this invention is in all cases so aligned that when engaged by the lifting device, the helicopter is substantially balanced on the cross bar of the yoke, resting in one or more receiving members or cradles of the lifting device. In FIGS. 6, 16 and 17 there is shown a low profile truck (11) with a hydraulic lifting device (14) shown in the retracted position in FIGS. 6 and 16 with dotted lines to show the elevated position in FIG. 6. The mobile lifting and towing device preferably comprises a towing truck and an elevating dolly. The elevating dolly, as shown in FIG. 6, has a single longitudinal structural element for a chassis which can be rotatably attached to the power truck at either end to allow for easy removal of the dolly from underneath the helicopter in confined spaces. Such rotational coupling can be achieved by any convenient method, for example, a pivoting link pin assembly as shown at (17) with means not shown, to lock said structural element in the fixed position. Alternatively, the elevating dolly can be provided with a steering assembly comprising a tow bar and the rods in lieu of front end casters. The lifting device or jack (23) is carried on the dolly for support by the chassis, preferably over or near the axle of the rear wheels. The lifting device itself can be any suitable lifting means including hydraulic jack, mechanical screw-type jack, scissors jack, and the like. The dolly can be self-powered or towed by any suitable power vehicle. The dolly can have a single steering wheel in front or a dual wheel turning arrangement.

A further optional arrangement is shown at FIGS. 16 and 17 wherein the chassis of the elevating dolly (11) is itself a telescoping arrangement which can be conveniently shortened for smaller helicopters or lengthened for handling larger helicopters. If desired, the dolly can be provided with an elevating frame to engage supporting yokes or like assemblies installed on both the fore and aft struts of a skid-equipped helicopter. It is intended to encompass within the scope of the invention, all such alternative structural arrangements where by an adjustable supporting element is easily attached to any conventional helicopter by the use of adapter elements to connect the supporting element to the fixed lifting points of the helicopter.

In a preferred embodiment, the elevating dolly can be a simple T-bar chassis with axles and wheels on the ends of the crossbar and a pivoting wheel or caster in front. The extended member of the chassis can be made telescope lonitudinally as illustrated by FIGS. 16 and 17, to lengths preferably between about 9 ft. and 11 ft. to accomodate conventional helicopters. The caster or equivalent steering arrangement is so located as to assure a minimum turning radius. The preferred lifting mechanism is a set of dual hydraulic rams equipped with u-shaped fitting to engage the yoke. The hydraulic rams should be mounted just forward of the rear axle. A single hydraulic ram can be used but, in all cases, the fitting that mates with the yoke should be sufficiently wide to provide stability in the transverse direction and to automatically position the lifting cradle or like means for engaging the yoke, so that substantially the entire lifting force is transmitted through the center of mass or center of gravity as shown in FIG. 1. The preferred hydraulic lifting devices are by hydraulic lines, interrupted with quick disconnect couplings, to the power source in the tow truck with controls located on the tow truck.

The supporting element is made to be adjustable so that one supporting element can be provided for use with all conventional helicopters. The adapter elements, on the other hand, will, in all instances, have one mating element for releasable attachment to the universal supporting element and the second mating element specifically designed for each particular type of helicopter. In some instances, for example, those helicopters provided with a wheel mounting element capable of receiving a wheel axle, the supporting element, in accordance with this invention is made with axle-type ends that can be inserted directly into the wheel mounting elements.

An illustrative adapter (7) is shown in FIG. 9. The adapter, as shown, comprises an attachment plate (71) with lug (72) and slots (73, 74 and 75) so arranged as to mate with the wheel attachment lugs and slot in one particular conventional helicopter skid-type landing gear. Mounted on the attachment plage, by welding or other suitable means, is a u-shaped member (76) extending perpendicular to the attachment plate and arranged for slidably-receiving the end of the supporting member (67). Suitable bracing illustrated by (77) can be provided as necessary. Optionally, the attachment plate or bracket can be provided with a lug-type connector adapted to fit into a sleeve type receptor member on the end of the supporting element (67).

Referring again to FIG. 2, a truck (16) having mounted thereon a power unit (18) is shown with steering handle (20) in the down position; from the power unit, hydraulic lines (30) and (39) are connected to hydraulic manifold (40) where the power source is distributed between hydraulic lines (41) and (42) on one side and lines (43) and (44) on the other side which activate hydraulic lifts mounted on either side of the dolly. The hydraulic lines are detachable through conventional couplings. The hydraulic lifts are controlled through the power source (18) by the operator situated in front of the power truck through a control device located in a handle (20). The power truck can also function as an auxiliary power unit for helicopter start-up and the like. Alternatively, the power truck can be electric or battery-operated with electric lifts instead of hydraulic lifts. Power trucks and elevating dollys are available commercially and can be utilized by adapting the elevating device for use with the lift support element or yoke by fitting the jack or jacks with a suitable connecting device or cradle to engage the yoke and hold the helicopter supported off the ground. Preferably, the elevating system in the dolly is provided with a switch or valve to lock the hydraulic or similar jacks in either the up or down position. Likewise, the power wheel of the dolly is preferably equipped with a braking system including a locking device to prevent rolling movement while the helicopter is elevated or dropped.

Referring now to FIGS. 7 through 13, there are shown optional arrangements for attaching the support element to the fixed lifting points on skid-equipped helicopters. In Example 7 there is shown a wheel mounting bracket (81) mounted on skid (8), said wheel mounting bracket carrying lugs for quickly and releasably attaching a plate which normally carries an axle and wheel. In accordance with this invention, there is provided an adapter (7) comprising a fixed plate (71) with a hole and slots to mate with the pre-existing lugs on the wheel mounting bracket (81) and carrying a sleeve-like receptacle to receive the supporting element. The adapter (7) is substantially as shown in FIG. 9. FIG. 8 shows the same adapter (7) attached to a helicopter skid with the supporting element (67) inserted therein.

FIG. 10 shows a variation in which an adapter (82-a) is provided for attachment to a tubular skid. The section of the adapter affixed to the tubular skid can be in the form of a semi-circle with quick release pins inserted through both branches of the adapter and the tube received within the adapter or, alternatively, it can be constructed as shown in FIG. 10 and FIG. 11, wherein the adapter (82-a) fits over the top and one side of a tubular skid. Still another embodiment is shown in FIG. 12 wherein an adapter (82-c) is shown permanently mounted on a tubular skid by welding, shown also in end elevation in FIG. 13.

The preferred adapter configuration is one which requires little or no alteration of conventional skids and includes adjustable adapters that can be removably attached directly to supporting struts without modification or damage thereto. Where wheel attachment fittings are provided, it is preferred to use an adapter comprising an attachment bracket or plate of similar design and dimensions as the wheel attachment without the wheel and axle but simply carrying a receptacle for receiving one end of the cross bar so as to facilitate its use by permitting the adapter to be installed on the existing lugs intended for the wheel plate. The adapter can, however, be of any suitable design. It can, for example, be cast as an integral unit with the mounting plate and connecting bar receiver as a single piece or the connecting bar receiver can be made separately and fixed to the mounting plate or it can be welded thereto. The adapter, when joined to the supporting cross bar, should in all cases locate the receptacle for the lifting member on the approximate center of gravity plane transversly through the helicopter.

The invention may be more fully understood by reference to the attached drawings which illustrate several embodiments of the universally adaptable helicopter lifting and transporting assembly. The use of such device is to enable one person to conveniently elevate and transport a number of skid-equipped helicopters on the ground with only one supporting element and only a limited number of adapters determined by the different number of helicopter designs to be accomodated. The invention, therefore, permits a ground handling installation to elevate and transport large numbers of helicopters without the need for auxiliary ground equipment that remains with the helicopter while on the ground, as is generally the present practice.

I claim:

1. Helicopter ground handling equipment comprising adjustable load carrying means universally adapted for attachment to existing wheel attachment points on helicopters equipped with skid-type landing gear having fixed wheel attachment fittings; said ajustable load carrying means comprising a yoke assembly having a center section of adjustable length, left and right adapters, each adapter having on one side thereof a fitting adapted to mate with the existing wheel attachment fitting on the corresponding helicopter skid, and on the other side thereof, coupling means to couple said adapter to the ends of said adjustable center section having mating coupling means thereon; said yoke assembly providing a support by which the helicopter can be lifted by an upward force from a mobile lifting dolly engaging the yoke assembly and elevating the helicopter off the ground with substantially the entire weight of the helicopter borne by said yoke assembly being vertically aligned with the center of gravity of the helicopter thereby enabling the helicopter to be lifted and transported by movement of the mobile lifting dolly without any wheels attached directly to the skids.

2. Ground handling equipment in accordance with claim 1 wherein said mobile lifting dolly comprises a lifting element for operatively engaging said yoke assembly, said lifting element being mounted on a chassis supported by a rear axle with wheels on either side and at least one front wheel.

3. Ground handling equipment in accordance with claim 2 wherein the length of the chassis is adjustable.

4. Ground handling equipment in accordance with claim 3 wherein the chassis comprises a front section and a rear section pivotally joined in the mid section.

5. An apparatus for use in ground handling of helicopter equipment with two landing skids, each skid having a fitting directly opposite the fitting of the other skid by which an axle and wheel can be mounted on each skid for movement of the helicopter while on the ground; said apparatus comprising a pair of adapters for attachment to the wheel fittings on each skid; each adapter provided on one side thereof with a fitting to mate with the wheel fitting on the skid and provided on the other side thereof with coupling means for attachment to an adjustable load-carrying cross member provided for insertion between said adapters; said cross member having coupling means on each end adapted to mate with the coupling means on the adapters to form a load bearing yoke assembly; said yoke assembly providing a load bearing support for operative engagement with the lifting device on a mobile lifting and towing dolly such that the lifting force acts substantially through the center of gravity of the helicopter to enable the helicopter to be lifted and transported on the mobile dolly with substantially the entire load of the helicopter borne by the yoke assembly attached to the fixed wheel attachment points without any wheels attached directly to the skids.

* * * * *